United States Patent [19]
English

[11] 3,956,999
[45] May 18, 1976

[54] EARTHWORKING IMPLEMENT WITH AUTOMATIC FLUID FLOW SHUT-OFF MANIFOLD

[75] Inventor: J. L. English, Tell City, Ind.
[73] Assignee: Chem-Farm, Inc., Evansville, Ind.
[22] Filed: Dec. 19, 1974
[21] Appl. No.: 534,437

[52] U.S. Cl. ................................. 111/7; 172/413; 137/351
[51] Int. Cl.² .................................... A01C 23/02
[58] Field of Search ................... 111/7, 6; 172/413; 137/351

[56] References Cited
UNITED STATES PATENTS

| | | | |
|---|---|---|---|
| 3,031,983 | 5/1962 | Hanson | 111/7 X |
| 3,518,953 | 7/1970 | Johnston | 111/7 |
| 3,608,645 | 9/1971 | Meiners | 111/7 X |
| 3,643,745 | 2/1972 | Betulius et al. | 172/413 |

*Primary Examiner*—Stephen C. Pellegrino
*Attorney, Agent, or Firm*—Olson, Trexler, Wolters, Bushnell & Fosse, Ltd.

[57] ABSTRACT

An earthworking implement such as a tractor-drawn chisel plow having a fertilizer tank is provided with an automatically operated control system for fluid dispensing when the implement is work configured. In one embodiment the implement is provided with a rockshaft for moving implement wheels between a wheels up, implement working position and a wheels down, implement transport position. An interconnector cable is wrapped at one end around the rockshaft. As the rockshaft turns and rotates the wheels into the implement working position, the cable pulls the valve stem of a fluid metering valve partially out of the valve, thereby opening the valve and permitting fluid flow.

4 Claims, 3 Drawing Figures

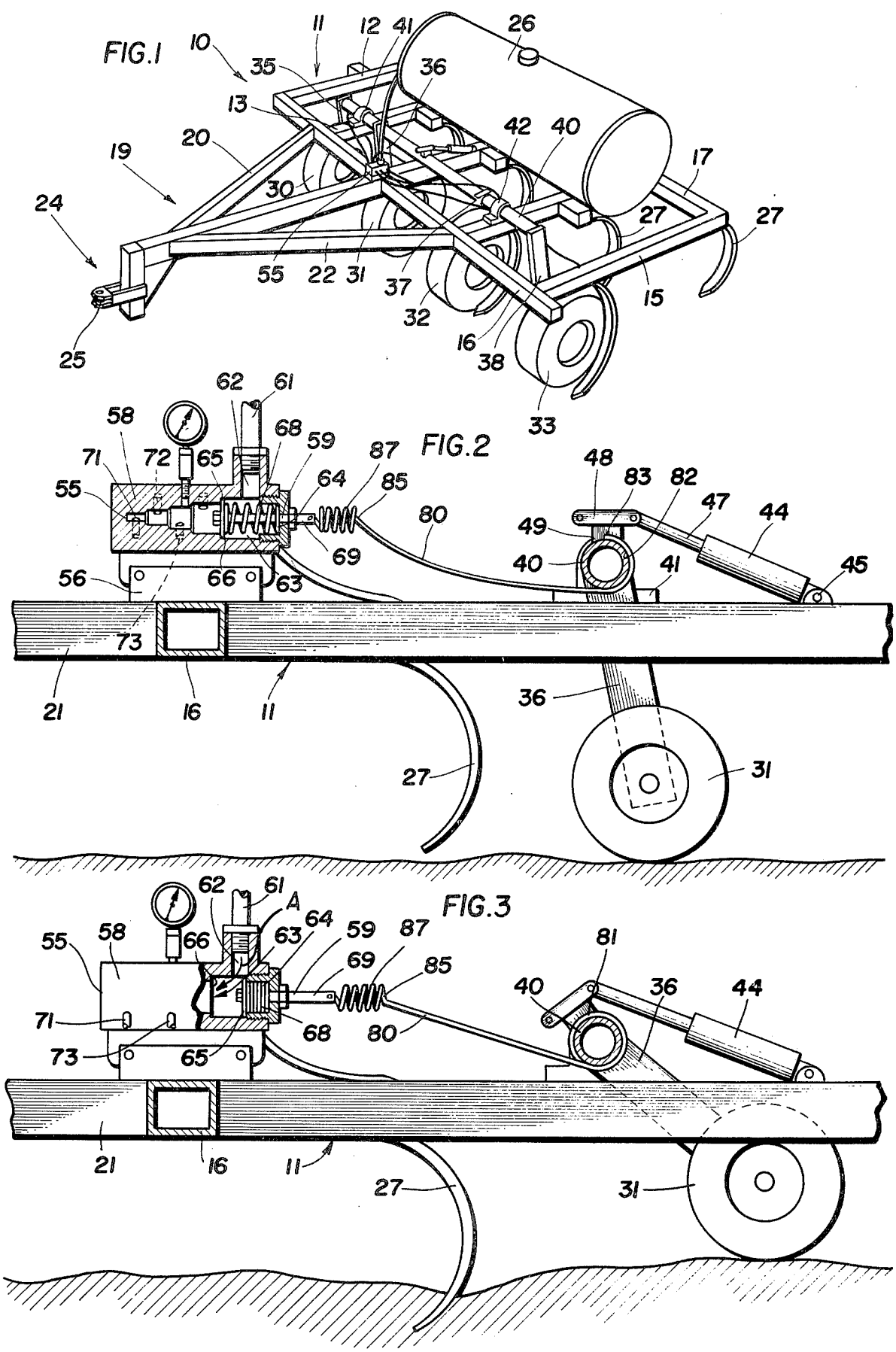

EARTHWORKING IMPLEMENT WITH AUTOMATIC FLUID FLOW SHUT-OFF MANIFOLD

BACKGROUND OF THE INVENTION

This invention relates generally to earthworking implements and more particularly concerns an implement having an automatically operable manifold valve for controlling the flow of fertilizer or other fluid in response to the configuration of the implement for either working or transport.

Relatively recent advances in agriculture have made it desirable to mount a fluid tank upon the frame of a chisel plow or other implement for fertilizing or otherwise treating a field as it is formed. Fluid dispensed from the tank flows along conduits to nozzles near the ground working elements for final dispensation.

U.S. Pat. No. 3,643,745 discloses a chisel plow which may be provided with a fertilizer tank, and which is provided with wheels and wheel strut assemblies which can be rotated from a relatively lowered implement transport configuration to a relatively raised implement work configuration. In their lowered positions, the wheels extend below the bottom of the plow chisels, and permit rapid implement transportation over highways or other surfaces without chisel-ground surface engagement. As the wheels and struts are raised relative to the implement superstructure into their implement work positions, the plow chisels are correspondingly lowered to engage the ground to be worked.

It is a general object of the present invention to provide an earthworking implement having a valve which controls flow of fertilizer or other fluid between a supply tank and dispensing nozzles, the action of the valve being controlled by the position of various implement parts in either a transport or a working configuration.

Another object of the invention is to provide an earthworking implement having a valve which permits flow of fertilizer or other fluid from a supply tank to nozzles only when implement parts are located in a work configuration.

Another object is to provide a valve for an earthworking implement which acts positively even when implement wheels and struts or other parts are displaced slightly and momentarily by bumping or jarring action when the implement is being transported or pulled over relatively rough terrain.

Another object of the invention is to provide a valve and related structure for use as described which is inexpensive in cost, yet reliable and rugged in operation.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a perspective view showing the novel valve and associated apparatus in its general aspect when used with an earthworking implement;

FIG. 2 is a side elevational view showing, in elevational and partial sectional aspect, the valve, implement and related parts as they appear when the implement is configured for transportation over a highway or the like; and FIG. 3 is an elevational and partially sectional view similar to FIG. 2 but showing the valve and implement as it appears when configured for work or plowing action.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning first to FIG. 1, there is shown an earthworking implement 10 for use with the fluid dispensing valve and system. Here, this implement 10 can be considered to generally include superstructural framework 11 formed of structural members 12–17 inclusive. These structural members 12–17 comprise square wall tubing welded or otherwise conveniently joined together to provide the illustrated rigid superstructure. A drawbar 19 comprising square walled structural tubing members 20–22 inclusive is provided for towing the implement over a highway or through a field. At its forward end 24, the drawbar is provided with a tractor hitch 25 of appropriate type. For dispensing fertilizer or other fluid to the plowed ground, a fertilizer supply tank 26 can be mounted in a convenient position upon the implement superstructure 11. Chisel elements 27 or other ground working members depend from the frame 11.

The frame 11 is supported above the ground by a wheel assembly which, here, includes four wheels 30–33 spaced in a configuration transverse to the main drawbar 21. So as to provide stable support for the earthworking implement even though one or more of the wheels 30–33 can become momentarily disengaged from the supporting earth surface, each wheel 30–33 is journalled upon a strut 35–38, respectively. The struts 35–38, in turn, extend radially from a rockshaft 40 for angular movement with the rockshaft relative to the frame 11 between the illustrated transport and work positions.

To move the wheels between a lowered, implement-transport position such as that illustrated in FIG. 2 and a raised, implement-working position such as that illustrated in FIG. 3, the rockshaft 40 is transversely journalled for at least limited rotation upon the implement frame 11 by journal bearings 41–42 or other convenient apparatus. To rotate the rockshaft 40 and move the struts and wheels between the illustrated positions, a hydraulic cylinder 44 is attached, as by a pin connection 45, to the frame 11. In the illustrated embodiment a piston rod 47 is attached by an appropriate strut 48 and pin 49 to the rockshaft 40. Extension or retraction of the cylinder rod 47 relative to the cylinder 44 causes rotation of the rockshaft 40 and consequent movement of the wheels and wheel struts between the illustrated work and transport positions.

In accordance with the invention, a fluid dispensing manifold valve 55 is provided to control the flow of fertilizer from the supply tank 50 to the nozzles (not shown) located near the plow chisels 27. As particularly illustrated in FIGS. 2 and 3, this fluid dispensing manifold valve 55 can be mounted at a convenient place upon the frame 11, by a mounting flange 56 or other convenient device. In general, this valve 55 can be considered to include a relatively stationary housing member 58 and a stem assembly 59 which is movable relatively into and out of the housing 58 to adjust the flow of fluid. Fluid flows to the valve 55 from the remote supply tank 26 along a conduit 61 where it is admitted, by a suitable port 62, to a valving chamber 63. Carried for reciprocal motion in the valving chamber 63 is a slide valve assembly 64, which here consists of a piston 65. The valve piston 65 is normally biased into the closed position illustrated in FIG. 2 as by a coil spring 68 which can be mounted around an interior portion 69 of the valve stem 59. When the valve piston is biased into its normally closed position, fluid flow 55 from the access line 61 through the port 62 is prevented. However, when the valve stem 69 is partially withdrawn from the valve, as illustrated in FIG. 3, and the valve plate 65 is drawn past the inlet port 62, fluid flow is permitted. Since a positive pressure is maintained inside the supply tank 26, fluid flows through the valve chamber 63 in the direction illustrated by the arrow A in FIG. 3 to header bores 71–74.

In accordance with another aspect of the invention, fluid flow through the manifold valve 55 is related to configuration of implement parts in a first implement transport position or in a second implement working position. In the illustrated embodiment, the implement is configured for work when the wheels and wheel struts are located in a wheels up position; the implement is configured for transport when the wheels and wheel struts are located in a wheels down position.

Interconnecting the valve stem 59 and rockshaft 40 is an interconnector cable 80. One end 81 of the cable 80 engages the surface 82 of the rockshaft 40 and is affixed thereto, as by a screw 83 or other convenient means. The other end 85 of the cable is functionally connected to the valve stem 69. In the illustrated embodiment, a resilient spring 87 is interposed between the valve stem 69 and cable end 85 to prevent excessive tension from being applied to the valve stem 69 by the cable 80.

When the fluid cylinder 44 is actuated and the rockshaft 40 is rotated, as illustrated in FIG. 3, to bring the wheels and struts up into the implement working position, the interconnector cable 80 is caused to wrap at least partially around the rockshaft 40 at its first end 81, thereby causing the other cable end 85 to tension the interconnector spring 87 and partially withdraw the valve stem 69 from the valve 55, thereby opening the valve chamber 63 and permitting fluid flow.

Alternatively, when the hydraulic cylinder 44 is actuated to lower the wheels from the position illustrated in FIG. 3 to the transport position illustrated in FIG. 2, the first end 81 of the cable 80 is relatively unwrapped from the rockshaft 40, thereby detensioning the cable 80 and releasing the valve stem 69. The interior valve spring 68 is thereby left free to move the vavle plate 65 toward the end of the valve chamber 66, closing the valve and halting fluid flow.

In carrying out the invention, the cable is related to the rockshaft by laying that portion of the cable 80 which is adjacent the first end 81 underneath the rockshaft 40, as illustrated. Thus, when the rockshaft is moved from its wheels down, implement transport position shown in FIG. 2 to the wheels up, implement working position shown in FIG. 3 an additional amount of cable 80 is wrapped around the rockshaft 40 and the second end 85 of the cable is drawn away relatively from the valve 55, thereby pulling the valve stem 69 partially out of the valve and opening the valve for fluid flow.

The invention claimed is as follows:

1. For use with an earthworking implement having a rigid frame, a fluid source mounted on said frame a rockshaft transversely journalled upon said frame, rockshaft moving means, a plurality of wheel supporting strut means affixed to and extending radially from said rockshaft for angular movement with the rockshaft relative to the frame from a transport position to a work position, fluid dispensing manifold valve means mounted on the frame, the valve means including housing means having an inlet port connected to said fluid source, stem means movable into and out of the housing means, and a valve plate connected to the stem means and movable past the inlet port to adjust a flow of fluid, the apparatus further including bi-ended interconnector means at one end engaging the surface of the rockshaft so as to be wrapped around at least a part of the rockshaft surface, bi-ended safety spring means connected at one end to the remaining interconnector end and at its other spring end connected directly to the valve stem means, angular motion of the rockshaft and wheel-supporting struts between the transport position and the work position causing the one interconnector end to wrap and unwrap around the rockshaft surface and causing the other interconnector end and tensioned safety spring means to move the valve stem partially into and out of the valve housing, thereby moving the valve plate past the valve inlet port and prohibiting and permitting fluid flow through the valve without accidentally overtensioning the interconnector means and the valve stem.

2. A device according to claim 1 wherein said valve means includes a housing and wherein said stem is drawn partially out of said valve housing by the action of said interconnector means and safety spring means to permit fluid flow.

3. An earthworking implement according to claim 1 including chisel plow elements fixed to said frame, and wherein angular rotaton of said wheel supporting structure toward said frame permits said chisel plow elements to engage ground for plowing, angular rotation of said rockshaft further moving said valve stem relative to said housing to permit fluid to flow through said valve and to be dispensed adjacent plow elements, thereby permitting simultaneous plowing and fertilizing.

4. An earthworking implement according to claim 1 wherein said stem is drawn out of said valve housing to permit fluid flow by the action of said interconnector when said rockshaft is rotated to move said wheel supporting structure into said implement working position.

* * * * *